May 7, 1957 B. P. CHAUSSE 2,791,733
WARD-LEONARD CONTROL SYSTEM
Filed Dec. 23, 1954 2 Sheets-Sheet 1

Fig. 1.

Inventor:
Burnette P. Chausse,
by J Wesley Haubner
His Attorney.

United States Patent Office 2,791,733
Patented May 7, 1957

2,791,733

WARD-LEONARD CONTROL SYSTEM

Burnette P. Chausse, Scotia, N. Y., assignor to General Electric Company, a corporation of New York Application December 23, 1954, Serial No. 477,367

14 Claims. (Cl. 318—143)

This application is a continuation-in-part of my prior application Ser. No. 424,603, filed April 21, 1954, entitled "Control System," and which has now become abandoned.

This invention relates to control systems, more particularly to systems controlling the operation of electric motors, and it has for an object the provision of a simple, reliable, and improved control system of this character.

More specifically, the invention relates to electric motor control systems for elevators and the like in which the motor is supplied from an adjustable voltage generator, and a more specific object of the invention is to provide an improved system for automatically regulating and controlling terminal electrical characteristics of the generator such as the terminal voltage and armature current, and corresponding characteristics of the motor supplied therefrom, i. e. speed and acceleration.

In a high speed elevator application, it is desirable that the elevator car start, reach maximum running speed and stop within the shortest period of time consistent with the comfort of the passengers riding therein. An excessive rate of change of acceleration of the car may cause discomfort in the stomach of an ordinary passenger, while an excessively great acceleration may adversely affect his feet and legs. Accordingly, a further object of this invention is the provision of means for regulating and limiting the rate of change of acceleration and the rate of change of speed of the motor to desired maximum values.

Normally, to aid in smoothly and accurately stopping and leveling the elevator car at a landing, a plurality of reference members are provided in the elevator shaft for each landing to permit checking the position of the car. It is therefore a further object of this invention to reduce the number of reference members required and to eliminate the necessity for extremely accurate location of these members by the provision of means for limiting the maximum deceleration of a motor to a predetermined desired value and for smoothly and accurately regulating the rate of change of deceleration.

A still further object of this invention is to reduce the time required for a motor to change speed from one value to another while preventing the undesirable condition of speed overshoot as the motor reaches its new value of speed by providing a control means for automatically reducing the acceleration or deceleration of the motor as the new speed value is approached.

Another object of this invention is to provide a motor speed and acceleration control and regulating system having an exceptionally fast speed of response and a high degree of sensitivity.

It is a further object of this invention to provide an improved control system for automatically regulating and controlling the speed and acceleration of a motor irrespective of variation in load on the motor.

In carrying out my invention in one form, an electric motor is supplied from a generator having adjustable voltage to vary the speed of the motor. The generator is provided with a separately excited shunt field winding excited by means of an armature reaction excited dynamoelectric machine which is provided with a plurality of control field windings. A first control field winding is connected to be energized by the difference of an adjustable reference voltage and a control voltage proportional to the speed of the motor so that excitation of the generator, and consequently the generated voltage and the speed of the motor, will be brought to a value at which the control voltage will be in correspondence with the reference voltage. A means is provided to limit the maximum excitation of this control field winding to a predetermined value. For the purpose of limiting and regulating the rate of change of acceleration of the motor, another control field winding is connected to be energized by a voltage proportional to the rate of change of current in the armature of the motor and to oppose and limit the excitation of the dynamoelectric machine causing the change in armature current. In order to prevent excessive acceleration of the motor, another control field winding is connected to be energized by a voltage proportional to the rate of change of control voltage and to oppose and limit the excitation of the dynamoelectric machine causing the change in motor speed. Another control field winding is connected to be energized in direct relation to the magnitude of armature current and to aid the first control field winding to provide excitation to compensate for variation in the load current of the motor.

In a modified form of the invention, the excitation of the generator is obtained by means of high speed, high gain magnetic amplifiers provided with a plurality of control windings corresponding to and energized in the same way as the control field windings of the armature reaction excited dynamoelectric machine as just described. In this way the same speed and acceleration characteristics of the motor are obtained.

My invention will be better understood and further objects and advantages will be apparent from the following description taken in conjunction with the accompanying drawing, Fig. 1 of which is a simple, diagrammatical illustration of a preferred embodiment of the invention. A modified form of the invention utilizing high speed, high gain magnetic amplifier elements is illustrated in Figs. 2, 3 and 4.

Figure 1:
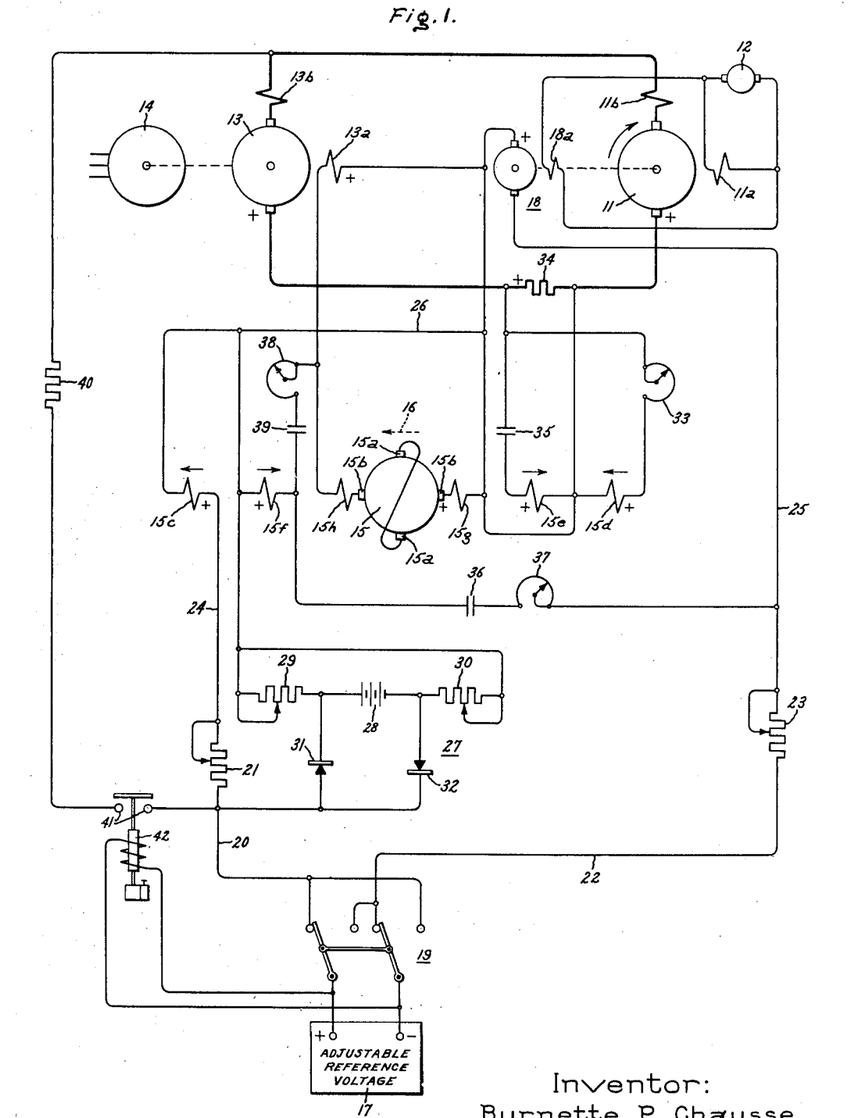

Referring now to Fig. 1 of the drawing, an electric motor 11 is connected to drive a load such, for example, as the car of a high speed elevator (not shown). The motor 11 is illustrated as a direct current motor provided with a separately excited shunt field winding 11a. This field winding may be excited from any substantially constant voltage source of excitation which is represented in the drawing by an exciter 12. The exciter 12 may be driven by any suitable driving means (not shown). The armature of the motor 11 is supplied from an adjustable voltage direct current generator 13 which is driven at a speed that is preferably substantially constant by suitable driving means, illustrated in the drawing as an induction motor 14.

The armatures of the motor 11 and generator 13 and their respective commutating field windings 11b and 13b are connected in a series loop circuit.

The voltage of generator 13 can be varied over a wide range by varying its excitation, and to this end the generator 13 is provided with a shunt field winding 13a which is excited by means of a special cross armature reaction excited direct armature reaction compensated dynamoelectric machine 15. The dynamoelectric machine 15 differs from a conventional direct current machine in that it has a pair of auxiliary brushes 15a arranged on an axis that is normally displaced substantially 90 electrical degrees from the axis of the main load brushes 15b. The auxiliary brushes 15a are substantially short circuited by an external conductor. The machine 15 is provided with four control field windings, 15c, 15d, 15e, and 15f. The combined effect of these four control field windings provides a relatively small number of net ampere turns, and a relatively small voltage is generated in the armature between the auxiliary brushes 15a as a result of rotation of the armature in the net flux of the control field windings. This relatively small voltage, however, produces a very large current in the short circuit, and the short circuit current gives rise to a very large cross armature flux. It is this cross armature reaction flux which provides the main operating flux, or excitation, for the machine and induces a very large voltage in the rotating armature between the main load brushes 15b. A pair of series field windings, 15g and 15h, are connected in circuit with the main load brushes 15b for substantially completely neutralizing or compensating for the direct armature reaction of the machine 15. The machine 15 is driven by any suitable driving means, such as an induction motor (not shown), at a speed that is preferably substantially constant.

Figures 2, 3, 4:
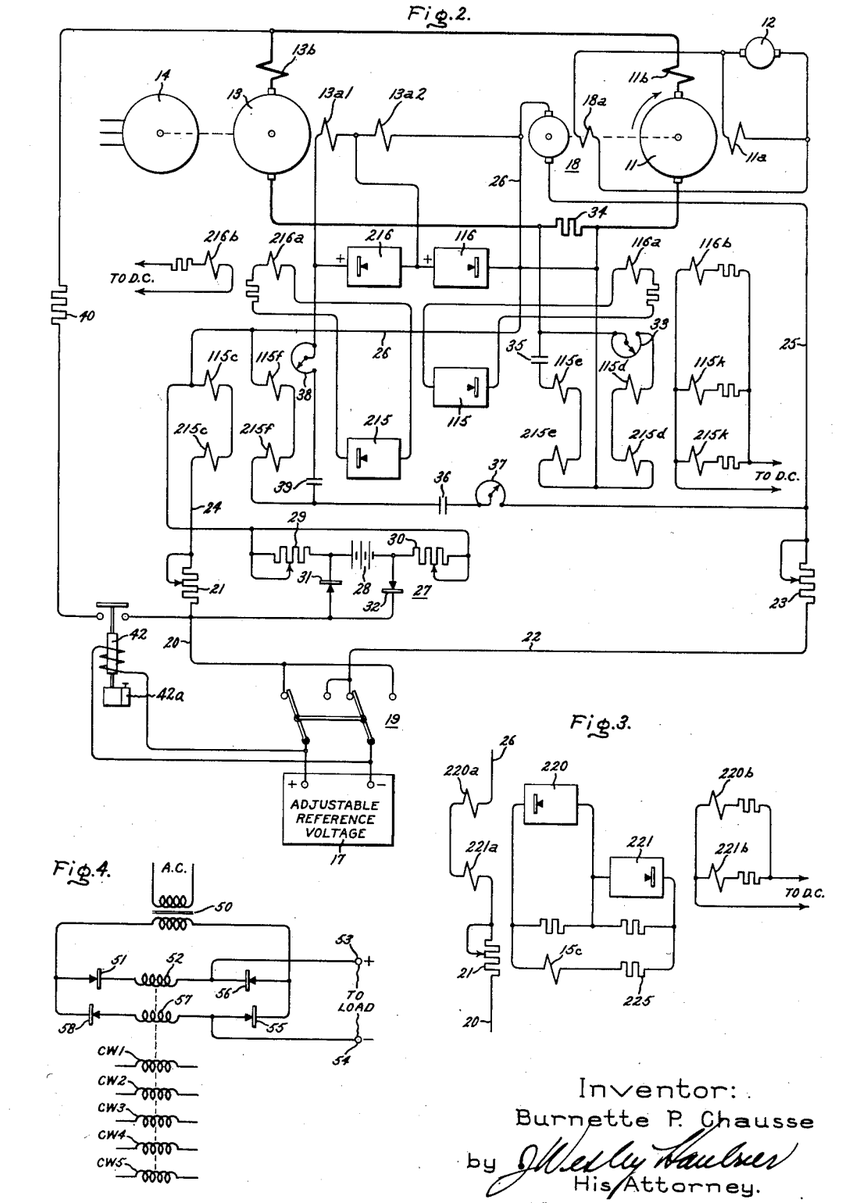

Two very important operating characteristics of the armature reaction excited machine 15 which result from the structure described above are an exceptionally high speed of response and a high gain, i. e., the ratio between the total watts input to excite the four control field windings and the watts output of the load brush circuit. It will be understood by those skilled in the art that there are other suitable amplifiers having the two important characteristics of an armature reaction excited dynamoelectric machine that may be substituted for the machine 15. For example, magnetic amplifiers might be employed to perform the function of the dynamoelectric machine 15 as shown in Figs. 2, 3 and 4 and specifically described hereinafter.

Because the speed of motor 11 is a direct function of the value of generated voltage or counter E. M. F. in its armature, and the counter E. M. F. is equal to the applied voltage less the voltage drop in the armature circuit, the speed of motor 11 can be regulated and controlled by suitable control of the applied voltage, i. e., the voltage generated by generator 13. The voltage of generator 13 can be accurately regulated by controlling the excitation of the generator shunt field winding 13a, and this is accomplished by controlling the output of the armature reaction excited dynamoelectric machine 15 by appropriate variations in the input signals to the four control field windings 15c, d, e, and f.

The regulating and controlling operation of the armature reaction excited dynamoelectric machine 15 will be readily understood by separately considering the effect of each of the four control field windings in turn and then considering their combined effect. To facilitate the description of the various control circuits shown in the drawing, positive polarity marks are included to indicate the direction of current flow, and solid-line arrows are shown to indicate the relative directions of flux produced in the control field windings of the machine 15. It will be assumed that when the net flux of the control field windings 15c, d, e, and f is in the direction indicated by the broken-line arrow 16, the output of the machine 15 will have the polarity shown, the polarity of the generator shunt field 13a will be as shown, the voltage generated by generator 13 will have the polarity indicated, and the motor 11 will tend to rotate in a clockwise or forward direction. It will be understood that with the net control flux of the machine 15 in the opposite direction from that shown, all of the above assumed polarities will be reversed and the motor 11 will tend to rotate in a counterclockwise or reverse direction.

Control field winding 15c is the main control field of the armature reaction excited dynamoelectric machine 15. This field normally has a greater number of ampere turns than any one of the other three field windings. The energization of the main control field winding 15c is controlled jointly by means of an adjustable reference voltage source 17 and a source 18 of control voltage proportional to the speed of the motor 11. A variable voltage determined by the difference between the reference and control voltages from sources 17 and 18, respectively, provides the input signal for the main control field 15c and determines the excitation produced thereby.

The adjustable reference voltage source 17 will determine the ultimate speed of the motor 11. The voltage of this source may be derived preferably from a substantially constant direct voltage source in combination with suitable controlling means to permit adjustment of the voltage magnitude, and for the sake of simplicity this arrangement has been represented in block form. The block represents, for example, a constant voltage provided by an exciter and a controlling means consisting of a plurality of resistors, rheostats, relays, and switches comprising an elevator control mechanism to select any desired value of reference voltage.

The adjustable reference voltage source 17 is connected to a reversing switch 19, which is illustrated as a manually-operated double pole, double throw switch. The polarity of the main control field 15c, the direction of net flux in the dynamoelectric machine 15, the polarity of the generator shunt field 13a, and consequently the polarity of the voltage of generator 13 and the direction of rotation of motor 11 will be affected by the position of the reversing switch 19. This switch is shown in its forward position resulting in forward rotation of the motor 11. The switch 19 is electrically connected by conductor 20 to a first adjustable resistor 21 and by conductor 22 to another adjustable resistor 23. The resistor 21 in turn is connected by conductor 24 to the main control field 15c, while conductor 25 connects resistor 23 to the control voltage source 18.

The control voltage source 18 as illustrated in the preferred embodiment of my invention comprises a tachometer generator. The tachometer generator 18 is provided with a separately excited shunt field winding 18a which may be excited from any substantially constant voltage source of excitation, shown in the drawing as exciter 12. The tachometer generator 18 is positively coupled to and driven by motor 11, and since the voltage generated is a direct function of the speed of rotation of the generator armature, the output of the tachometer generator 18, which is the control voltage, is directly proportional to the speed of motor 11. The polarity of the voltage generated by the tachometer generator 18 will be as shown for forward rotation of the motor 11, and the polarity of this control voltage will normally oppose the polarity of the reference voltage of source 17. It is essential to my invention that the control voltage be a measure of the speed of motor 11, but other suitable means may be employed in place of the tachometer generator for obtaining this voltage. For example, the control voltage could be derived from the voltage across the armature of motor 11 modified to represent the true counter E. M. F. in the armature which is a direct function of speed.

A conductor 26 connects the control voltage source 18 to the main control field 15c. A main control electrical circuit is thus formed, and this circuit can be traced from the positive terminal of the adjustable reference voltage source 17 to the reversing switch 19, through conductor 20 to the resistor 21, through conductor 24 to the main control field 15c, through conductor 26 to the control voltage source 18, through conductor 25 to resistor 23, and returning through conductor 22, to reversing switch 19 and to the negative terminal of the reference voltage source 17. The voltage drop across the main control field 15c, and thus the amperes flowing in the turns of winding 15c and the excitation flux produced thereby, will be determined by the difference between the opposing reference and control voltages from the sources 17 and 18, respectively. For any given desired value of speed of motor 11, with its corresponding fixed value of control voltage, a particular value of reference voltage can be selected that will oppose and be greater than the value of control voltage to produce a voltage drop across the main control field winding 15c having suitable polarity and magnitude to produce the necessary excitation of the armature reaction excited dynamoelectric machine 15 and thereby to produce the necessary excitation of the generator 13 to result in the required voltage level of generator 13 to maintain the speed of motor 11 at the desired value. Should the voltage of generator 13 tends to vary from this required level, and the speed of motor 11 tends to deviate from the desired value, the corresponding change in control voltage will initiate a corrective action changing the voltage drop across the main control field winding 15c to vary the excitation of the dynamoelectric machine 15 and thereby to vary the excitation of the generator 13 to result in correction of the voltage of generator 13. The main control circuit thus serves as a motor speed regulating means.

For reasons that will become apparent later in the specification, I provide an improved separately energized voltage limit current diverting means to limit the excitation current in the main control field winding 15c to a predetermined maximum value. The improved means employed in the illustrated embodiment of my invention comprises a separately energized voltage limit current bypass circuit 27 connected in parallel with the main control field 15c and resistor 21 to bypass excessive current. The bypass circuit 27 comprises a source 28 of preferably substantially constant direct bias voltage, a pair of adjustable resistors 29 and 30 and a pair of reversely connected half wave rectifiers 31 and 32. The bias voltage source 28 is represented as a battery but may be any suitable source of substantially constant direct voltage. This source is connected to form a loop circuit with the pair of resistors 29 and 30. The common connection between the resistors 29 and 30 is electrically connected to conductor 26. The pair of reversely connected rectifiers 31 and 32 are connected between conductor 20 and opposite terminals of the bias voltage source 28. With the reversing switch 19 in its forward position, as shown in the drawing, current will flow through rectifier 31 and resistor 29 of the bypass circuit 27 whenever the voltage between the conductors 26 and 20, which is the voltage drop across the main field 15c in series with resistor 21, exceeds the voltage drop across resistor 29. Should the reversing switch 19 be in its reversed position, current will flow through resistor 30 and rectifier 32 of the bypass circuit 27 upon the voltage between conductors 26 and 20 exceeding the voltage drop across resistor 30. A value of bias voltage is selected that will render the bypass circuit 27 current conducting whenever the voltage drop across the main field 15c exceeds a predetermined maximum value. Excessive current in the main control circuit corresponding to values of voltage drop in excess of the maximum value will be bypassed through circuit 27 thus limiting the excitation current in the main control field winding 15c to a desired maximum value. The circuit elements comprising the adjustable resistors 21, 23, 29 and 30 can be adjusted to the values necessary to obtain the desired result as outlined above.

It will be understood by those skilled in the art that other means may be used to perform the function of the bypass circuit described and shown in the preferred embodiment of my invention. For example, a pair of magnetic amplifiers might be arranged in the circuit of the main control field 15c to be saturated upon a predetermined value of current flowing therein to limit the current to the predetermined value and thereby to limit the excitation of the main control field 15c, as is shown in Fig. 3 and more fully described hereinafter.

The speed regulating operation of the main control circuit is independent of and substantially unaffected by the amount of load being driven by motor 11. However, the speed regulation of motor 11 will be affected to a slight degree at slow speeds by the load. The motor torque is a direct function of armature current, and for a given value of applied voltage, variation in the armature current will affect the voltage drop in the armature circuit which will vary the counter E. M. F. in the armature and thus the motor speed. To compensate for the armature voltage drop (IR drop), I provide a second control field winding 15d for the armature reaction excited dynamoelectric machine 15. The IR compensating control field 15d is electrically connected in series with a rheostat 33, and to obtain an input signal this combination is connected across suitable voltage drop device included in the series loop circuit of the generator 13 and motor 11 armatures. A resistor 34 is illustrated as providing this voltage drop which is directly proportional to the armature current of motor 11 and therefore a measure of the armature voltage drop. Therefore, the voltage impressed upon the IR compensating field 15d, and thus the amperes flowing in the turns of winding 15d and the excitation flux produced thereby, will be a measure of the armature voltage drop. With the IR compensating field 15d connected as illustrated in the drawing, the excitation flux produced thereby will be in a direction to aid the excitation flux of the main control field 15c. For example, given a slow speed of the motor 11 in its forward direction, any increase in load will cause increased armature current, and the excitation in the IR compensating field 15d will correspondingly increase in the direction of the arrow shown above this field in the drawing to aid the excitation of the main control field 15c. The resulting increase in the output of the dynamoelectric machine 15 will increase the excitation of the generator 13 and thereby increase the voltage applied to the armature of motor 11 which will compensate for the increased voltage drop in the armature circuit of motor 11 to maintain the necessary value of counter E. M. F. to maintain the given speed.

The remaining two control field windings, 15e and f, are provided to control and limit the rate of change of acceleration and the rate of change of speed of the motor 11 respectively. These two control fields will be energized whenever the motor speed is being changed from one value to another by controlled variation of the reference voltage of source 17. A change in the reference voltage will cause a change in the excitation of the main control field 15c which will result in a corresponding change in the voltage level of generator 13. The changing applied voltage at the armature of motor 11 will cause armature current to increase or decrease thus creating accelerating or decelerating torque tending to change the motor speed to the desired new value. The rate of change of armature current is a direct function of the rate of change of acceleration of the motor 11. (For the purposes of this specification the single term acceleration will be used to mean both acceleration and deceleration, unless clearly indicated to the contrary.) The rate of change of the control voltage of source 18 is a direct function of the rate of change of speed, i. e. acceleration, of the motor 11.

To maintain a desired rate of change of acceleration of motor 11, control field winding 15e is connected in series circuit with a capacitor 35 and the combination is electrically connected across resistor 34 located in the series loop circuit of the generator 13 and motor 11 armatures. The rate of change of armature current is directly proportional to the rate of change of voltage drop across resistor 34 which provides an input signal for control field 15e. The magnitude of charging current in the field 15e-capacitor 35 circuit will be directly proportional to the rate of change of this input voltage. Thus the amperes flowing in the turns of winding 15e and the excitation flux produced thereby will be a measure of the rate of change of acceleration of the motor 11. The connections of this rate of change of acceleration control circuit are chosen so that the control field 15e will have the proper polarity to produce excitation flux tending to change the output of the dynamoelectric machine 15 and thus the voltage of generator 13 to oppose the change of acceleration. Given a desired rate of change of acceleration of motor 11, particular values of resistance 34 and capacitance 35 and a particular number of turns in field winding 15e can be selected to give the proper magnitude of ampere turns in control field winding 15e at the desired rate of change of acceleration opposing the net ampere turns of the dynamoelectric machine 15 to limit the excitation of the machine 15 and consequently the excitation of the generator shunt field 13a thereby to control the change in voltage of generator 13 to maintain the desired rate of change of acceleration of the motor 11. Any tendency of the motor 11 to deviate from the desired rate of change of acceleration during the time that its acceleration is undergoing change will alter the current in the control field winding 15e and thereby alter the net excitation flux of the dynamoelectric machine 15 and the excitation of the generator shunt field 13a to oppose the tendency to deviate from the desired rate of change of acceleration and to correct therefor.

One reason for the means for limiting the maximum value of excitation current in the main control field winding 15c is now apparent. The bypass circuit 27 described herebefore will bypass an amount of current in the main control circuit in excess of a predetermined maximum value, thereby limiting the amperes flowing in the turns of winding 15c and the resulting excitation flux to a particular maximum magnitude. Whenever there is an extreme change in the adjustable reference voltage in pursuance of a desired great change of speed of motor 11, there will be a tendency for a very large value of current to flow in the main control circuit. Until the value of the control voltage, and thus the speed of motor 11, approaches to within a predetermined limit of the new reference voltage level, determined by the voltage required to make the bypass circuit 27 operable, the excitation of the main control field 15c will be maintained constant at the particular maximum value. Because the maximum excitation of the main control field 15c is limited to a known constant value, it is possible to select the values of the rate of change of acceleration circuit elements, as described above, to result in the necessary excitation of the control field 15e opposing the net excitation of the dynamoelectric machine 15 to limit the rate of change of acceleration of motor 11 to the desired value regardless of the magnitude of the change of reference voltage.

To limit the maximum acceleration of motor 11 to a desired value, control field winding 15f is connected in series circuit with a capacitor 36 and a rheostat 37, and this combination is electrically connected across the control voltage source 18 which furnishes an input signal therefor. The rate of change of the control voltage, which is the measure of the rate of change of speed, i. e. acceleration, of motor 11, is directly proportional to the magnitude of charging current in the field 15f-capacitor 36-rheostat 37 circuit. Thus the amperes flowing in the turns of winding 15f and the excitation flux produced thereby will be a measure of the acceleration of the motor 11. The rate of change of speed control circuit is connected in a manner to produce excitation flux in the control field 15f opposing the excitation flux of the main control field 15c. To determine the value of capacitance 36 and resistance 37 along with the number of turns of control field winding 15f necessary to limit the acceleration of motor 11 to the desired maximum value, two requirements should be considered. The first requirement is that the RC time constant of the rate of change of speed control circuit be of sufficient value to delay the operation of the control field 15f during change of acceleration of the motor 11 until the acceleration has substantially reached the desired maximum value. Secondly, the amount of ampere turns in control field 15f corresponding to the maximum desired acceleration of motor 11 should oppose the ampere turns of the main control field 15c under maximum excitation in a manner to produce a net excitation in the dynamoelectric machine 15 suitably to control the excitation of the generator shunt field 13a and thereby to regulate the change of voltage of generator 13 to maintain the desired acceleration of motor 11.

With the motor 11 accelerating at the desired maximum value, any tendency to deviate from this value will initiate a signal in the control field 15f that will alter the net excitation flux of the dynamoelectric machine 15 and the excitation of the generator shunt field 13a to oppose the tendency to deviate from the desired value of acceleration and to correct therefor. As the motor 11 approaches its new speed level, the control voltage from source 18 will reach a value sufficient to reduce the voltage drop across the main control field 15c below the value necessary to maintain maximum excitation, and the excitation flux of the main control field 15c will begin to diminish. The opposing excitation flux of the control field 15f will be maintained due to the RC time constant and will dominate the net excitation flux. The dynamoelectric machine 15 will tend to react as though the new speed level has been reached, but the control field 15e will resist an instantaneous change of acceleration from the maximum value to zero and will limit the rate of change of acceleration of motor 11 to the desired value. The acceleration of motor 11 will therefore decrease at a constant rate until the new speed level has been reached with no overshoot. There being no further transitory conditions, the rate of change of acceleration and the rate of change of speed control fields, 15e and f respectively, will be deenergized and the main control field 15c together with the IR compensating field 15d will exclusively regulate the speed of motor 11.

For the purpose of providing maximum stability in my control system, an anti-hunt circuit is connected across the output of the armature reaction excited dynamoelectric machine 15. This circuit includes a rheostat 38 and a capacitor 39 connected in series circuit relation with the control field winding 15f. Changing output voltage of the dynamoelectric machine 15 supplies a signal voltage for the control field 15f, and the more rapid the rate of change of this signal voltage, the greater is the magnitude of charging current in the anti-hunt circuit and the greater is the excitation flux produced by the ampere turns of winding 15f. The connections are such that the excitation flux produced tends to change the excitation of the dynamoelectric machine 15 in a manner to oppose the change in its output voltage. This dampens the changing output voltage of machine 15 and substantially eliminates any unstable condition of hunting that might otherwise be present.

When the value of the adjustable reference voltage of source 17 is zero and the motor 11 has come to a standstill, there will be no excitation of the armature reaction excited dynamoelectric machine 15 and consequently no excitation of the generator shunt field 13a. However, residual magnetism in the generator field structure may prevent the voltage of generator 13 from dropping to zero, and a low value of residual voltage will result causing a heavy armature current to flow, tending to develop substantial torque in motor 11. To prevent this undesirable condition, I connect across the armature of the motor 11 a neutralizing circuit comprising a resistor 40 and a normally closed contact 41 of a time delay relay 42 in series circuit with the resistor 21 and the main control field winding 15c. Relay 42 is energized from the adjustable reference voltage source 17, and contact 41 will close with time delay in response to a reduction of the reference voltage to a value of zero. Thus the relay contact 41 is closed and the neutralizing circuit is rendered operable as a function of the stopping of motor 11. The neutralizing circuit is connected to the armature of motor 11 in a manner to conduct a quantity of current proportional to the residual armature current in a direction to produce excitation flux in the main control field 15c that will result in sufficient excitation of generator shunt field 13a to oppose and neutralize the residual magnetism in the generator field structure.

With the foregoing understanding of the apparatus and its organization in the system the operation of the system itself will readily be understood from the following detailed description. The direction of rotation of the motor 11 will be controlled by the position of the reversing switch 19. The relative relationship of polarity in all the circuits will remain the same and the operation of the control system will be identical for either forward or reverse rotation of the motor 11. Therefore, the operation of the system will be described for one direction of rotation only. It may be assumed that the reversing switch 19 is in its forward position, as shown, and that proper operation of the switch 19 from one position to the other will occur only when the motor 11 is at rest.

The motor 11 is started by increasing the reference voltage of source 17 from zero to a value corresponding to the desired speed. The control voltage of source 18 at the instant of starting is zero and consequently the voltage drop across the main control field winding 15c will be determined solely by the value of the reference voltage. The excitation current in the main control field 15c will rise practically instantaneously to a limited maximum magnitude, excess current in the main control circuit being bypassed through circuit 27. The maximum excitation current in the main control field 15c is greater than the normal current required to maintain the motor 11 at its desired speed, and a vigorous and effective forcing action on the excitation of the armature reaction excited dynamoelectric machine 15 is produced thereby. Consequently the voltage of the dynamoelectric machine 15 rises rapidly and applies a vigorous and effective forcing action to the generator shunt field 13a. As a result generator 13 begins to supply current to motor 11 which produces accelerating torque, and the motor begins to rotate.

As the armature current increases, excitation current begins to flow in the rate of change of acceleration control circuit producing excitation flux in control field winding 15e opposing the excitation flux of the main control field winding 15c. The rate of increase of armature current will rapidly increase to a value corresponding to the desired rate of change of acceleration of motor 11, and the strength of control field 15e at this instant will be sufficient to reduce the net excitation of the dynamoelectric machine 15 and consequently the excitation of the generator shunt field 13a to a value resulting in a generator output that will maintain a constant rate of increase of armature current to give the desired rate of change of acceleration. At this value of excitation a balance is established in the system which will be self-sustaining until the rate of change of speed control circuit affects the net flux of the dynamoelectric machine 15.

As soon as motor 11 begins to rotate and during the time that its speed is increasing, an increasing voltage will appear at the control voltage source 18. As the control voltage rises, excitation current flows in the rate of change of speed control circuit producing the excitation flux in control field winding 15f opposing the excitation flux of the main control field winding 15c. After a time delay determined by the RC time constant of this circuit, the strength of control field 15f will have reached a magnitude greater than that of the control field 15e and sufficient to reduce the net excitation of the dynamoelectric machine 15 and consequently the excitation of the generator shunt field 13a to a new value resulting in a generator output that will maintain a constant armature current to give a constant acceleration of motor 11. The magnitude of constant acceleration of motor 11 will be the magnitude of acceleration that has been reached by the motor 11 during the period of time delay of the rate of change of speed control circuit. At this new value of excitation another balance is established in the system which will be self-sustained until the motor 11 approaches its desired speed.

As the speed of motor 11 increases, the control voltage from source 18 will be increasing correspondingly. A value of control voltage will be reached opposing the reference voltage that will produce a voltage drop across the main control field 15c equal to the maximum amount required to make the bypass circuit 27 conducting. As the control voltage exceeds this value, the excitation current in the main control field 15c will begin to decrease, and the excitation of this field will be weakened. The net excitation of the dynamoelectric machine and consequently the excitation of the generator shunt field 13a will be reduced thereby to a new value tending to arrest the generator output and maintain the speed of motor 11 at its value then attained. However, the tendency of the armature current to decrease from its former constant value will cause excitation current to flow in the rate of change of acceleration control circuit producing an excitation flux in control field winding 15e aiding the excitation flux of the main control field winding 15c and opposing the excitation flux of the dominating control field winding 15f. The strength of control field 15e will be sufficient to maintain the net excitation of the dynamoelectric machine 15 and consequently the excitation of the generator shunt field 13a at a value resulting in a generator output that will maintain a constant rate of decrease of armature current to give the desired rate of change of acceleration of motor 11. As the motor speed continues to increase, the control voltage will continue rising and the excitation of the main control field 15c will continue to diminish. However, the rate of increase of control voltage will decrease as the acceleration of motor 11 decreases, and the opposing excitation of control field 15f will be weakened with time delay. A new equilibrium condition is established in the system as the acceleration decreases until the motor 11 reaches its desired speed.

At the time the motor 11 reaches its desired speed, the excitation flux of control fields 15e and 15f will be equal and opposite and the net excitation of the dynamoelectric machine 15 and consequently the excitation of the generator shunt field 13a will be determined by the excitation flux produced by the main control field 15c which now will have the proper magnitude to produce a generator output that will maintain a constant motor speed equal to the speed desired. Control fields 15e and 15f will be deenergized and a final balance is established in the system. Control field 15c will regulate the speed of motor 11 at its desired value until a new change in the adjustable reference voltage occurs.

To stop the motor 11, the reference voltage 17 is reduced to zero. If, as may be assumed, this is done suddenly, the voltage drop across the main control field winding 15c will be determined solely by the value of control voltage. The excitation current in the main control field 15c will rise practically instantaneously to its maximum magnitude, with excess current being bypassed through circuit 27, but this current will be in the reverse direction from that producing acceleration as previously described, due to the polarity of the control voltage source 18. As a result, the excitation of the armature reaction excited dynamoelectric machine 15 will be reversed, and the output voltage of the machine 15 will rise rapidly with reverse polarity to apply a vigorous and effective reverse forcing action to the generator shunt field 13a. The voltage of generator 13 is forced to decay very rapidly and the armature current of motor 11 will tend to reverse under the influence of the counter E. M. F. to produce decelerating torque.

The rate of change of armature current is opposed and limited to a value corresponding to the desired rate of change of deceleration of motor 11 by control field winding 15e in the same manner described herebefore for acceleration. The excitation of control field 15e opposes the excitation of the main control field 15c and a balance is maintained in the system until affected by the rate of change of speed control circuit.

The rate of change of motor speed is opposed and limited to a maximum value by control field winding 15f in the same manner described herebefore for acceleration. The excitation of control field 15f opposes with time delay the excitation of the main control field 15c to limit the excitation of the dynamoelectric machine 15 and consequently the excitation of the generator shunt field 13a to a value resulting in generator output that will maintain a constant armature current to give a constant deceleration of motor 11. Another balance is maintained in the system after deceleration of motor 11 has increased to its maximum value until affected by the speed of motor 11 approaching zero.

As the speed of motor 11 decreases, the control voltage will decrease to a value less than the maximum amount required to make the bypass circuit 27 conducting, and the excitation of the main control field 15c will begin to weaken. The net excitation of the dynamoelectric machine 15 in the reverse direction and consequently the reverse excitation of the generator shunt field 13a will be reduced to a value tending to arrest generator output. However, the tendency of the armature current to change will be opposed by the excitation of control field winding 15e and the deceleration of motor 11 will decrease at the desired rate of change under control of this field. A new equilibrium condition is established in the system as the deceleration decreases until the motor 11 reaches standstill at which time the excitation flux of control fields 15e and 15f will be equal and opposite and the net excitation of the dynamoelectric machine 15 will be zero.

Relay 42 is deenergized and contact 41 has closed by the time motor 11 reaches standstill, and the neutralizing circuit is rendered operable. Any tendency of the residual field magnetism of generator 13 to circulate armature current and thereby develop torque in the motor 11 is neutralized by the opposing excitation of the generator shunt field 13a resulting from excitation current flowing in the neutralizing circuit through the main control field winding 15c of the dynamoelectric machine 15. The response of the entire system is exceptionally fast. Any change in excitation of the dynamoelectric machine 15 will be reflected with substantially no time delay in the output of the machine 15, and similarly a change in excitation of the generator 13 will be reflected with substantially no time delay in the level of voltage generated.

The elements in the various control circuits of the system can be adjusted to give a rate of change of acceleration and a rate of change of speed of motor 11 equal to the maximum values of these rates permissible for the particular application of the motor 11. In this manner a minimum over-all time of response for changing the speed level of motor 11 from one value to another is obtained.

The operation of the system has been described for a change in motor speed from and returning to zero. However, each circuit of the system reacts in the same relative manner and performs the same function for a change of speed from one absolute value to another. As applied specifically to elevator operation, it is common to reduce the reference voltage 17 in predetermined steps as the car approaches a landing to obtain proper leveling. Due to the inherent characteristics in my control system limiting the rate of change of acceleration to a desired value, it is possible to reduce the number of steps of reference voltage to a minimum while still maintaining optimum comfort for passengers riding in the car.

The excitation of the IR compensating control field winding 15d, which is proportional to the load current of motor 11, will add to the excitation of the main control field winding 15c in a sufficient amount to affect the net excitation of the dynamoelectric machine 15 and consequently the excitation of the generator shunt field 13a to result in a generator output that will compensate for any IR drop in the motor armature circuit caused by variations in the load on motor 11.

As the armature reaction excited dynamoelectric machine 15 is basically a fast, high gain reversing D.-C. power amplifier with multiple control signal inputs, any other amplifier or combination of amplifier elements providing these same characteristics can be utilized in the improved motor speed and acceleration control system of the present invention. Fig. 2 shows one practical embodiment of the invention wherein a reversing combination of two-stage magnetic amplifier elements is utilized in place of the armature reaction excited dynamoelectric machine 15 of Fig. 1.

In the modified form of the invention shown in Fig. 2, the boxes 115, 116, 215 and 216 represent the power output circuits of the two-stage magnetic amplifier elements. Any of the various well-known magnetic amplifier power circuits are applicable; for example, D.-C. bridge, D.-C. center tap, or A.-C. outputs followed by a bridge rectifier. A schematic circuit arrangement of a typical form of magnetic amplifier element is illustrated in Fig. 4.

As the magnetic amplifier element shown in Fig. 4 is a non-reversing element, such elements must be used in reversed pairs to provide a reversible output. Many forms of reversing magentic amplifier circuits are in common usage and the circuits shown in Fig. 4 are merely typical.

As shown in Fig. 2, in order to reverse the excitation of the generator 13, two equal shunt field windings 13a1 and 13a2 are provided on the generator 13, each being excited by a corresponding one of the magnetic amplifier elements 116, 216 in opposite senses. Thus, with each of the magnetic amplifier elements 116 and 216 constructed as shown in Fig. 4, the field winding 13a2 will be excited by the output of the magnetic amplifier 116 when this element is turned on, and the field winding 13a1 will be oppositely excited by the output of the magnetic amplifier 216 when this element is turned on.

As shown schematically in Fig. 4, power is supplied to the amplifier element by means of the transformer 50 that may be energized from a suitable constant voltage A.-C. source. During one-half cycle energy is supplied through rectifier 51 and the saturable reactor 52 to the positive terminal 53 and thence through a corresponding one of the generator field windings 13a1 or 13a2 to the negative terminal 54 and thence through rectifier 55 whenever the reactor 52 becomes saturated. During the opposite half-cycle energy is supplied from the transformer secondary through rectifier 56 to the positive terminal 53 and thence through one of the generator field windings to the terminal 54 and thence through the saturable reactor 57 and the rectifier 58 whenever the reactor 57 becomes saturated. As is well-known, the saturation of the reactors 52 and 57 may be controlled jointly by means of a zero output biasing winding and one or more saturating or control windings.

As shown in Fig. 2, two-stage magnetic amplifier elements are provided in order to obtain materially increased control signal amplification. Thus, the output of the magnetic amplifier element 115 energizes the signal control winding 116a that in conjunction with the zero output biasing winding 116b controls saturation of the magnetic amplifier element 116. Likewise, the magnetic amplifier element 215 energizes the control winding 216a that in conjunction with the zero output biasing winding 216b controls the saturation of the magnetic amplifier element 216. This enables the several signal control windings 115c, 115d, 115e and 115f jointly with the zero output biasing winding 115k to control the saturation of the first stage magnetic amplifier element 115 and thereby with greatly increased amplification control the saturation of the magnetic amplifier element 116 in regulating the energization of the generator field winding 13a2. In exactly the same way the several signal control windings 215c, 215d, 215e and 215f in conjunction with the zero output biasing winding 215k control the saturation of the magnetic amplifier 215 and thereby the saturation of the magnetic amplifier 216 that oppositely excites the generator field winding 13a1. The bias windings 115k, 215k, 116b and 216b serve to set the no signal operating points of the corresponding magnetic amplifiers substantially at zero, thereby insuring that the amplifier output is correspondingly near zero with no signal on any control windings.

It will be observed in Fig. 2 that the several control windings of the magnetic amplifier element 215 are all reversed with respect to the corresponding control windings of the magnetic amplifier element 115 in the series circuits that are energized exactly in the same way as the corresponding field windings 15c, 15d, 15e, 15f of the armature reaction excited machine 15 shown in Fig. 1. Consequently, the excitation of generator 13 will be controlled in exactly the same way. Thus, if the reversing switch 19 calls for forward rotation of the motor 11, the magnetic amplifier element 115 will turn on and energize magnetic amplifier element 116 through winding 116a. The magnetic amplifier element 116 therefore excites the generator 13 through the field winding 13a2 to provide adjustably controlled forward voltage for the forward acceleration of the motor 11 that will be regulated in precisely the same manner as described with respect to the armature reaction excited amplifier 15 of Fig. 1.

Likewise, for deceleration or running of the motor 11 in the reverse direction, the magnetic amplifier elements 115 and 116 will turn off, and magnetic amplifier element 215 will energize the control winding 216a, causing the magnetic amplifier 216 to excite the generator field winding 13a1 to produce reverse excitation of the generator 13. During such operation the corresponding control windings of the magnetic amplifier 215 have exactly the same functions as the similarly lettered field windings of the armature excited dynamoelectric machine 15 shown in Fig. 1.

If desired, the bypass circuit 27 shown in Figs. 1 and 2 may be replaced by the functionally equivalent magnetic amplifier circuit shown in Fig. 3. As is illustrated in Fig. 3, I provide a pair of reversely connected magnetic amplifier elements 220 and 221 having saturating or control windings 220a and 221a, respectively, and zero output biasing windings 220b and 221b, respectively, to limit the maximum input signal supplied to winding 15c of the dynamoelectric machine 15 shown in Fig. 1. In the alternative, the series connected control windings 115c and 215c shown in the Fig. 2 embodiment of my invention may be excited by the magnetic amplifier circuit shown in Fig. 3. The magnetic amplifier elements of Fig. 3 are arranged to excite control winding 15c in accordance with the energization of their saturating windings which are connected in the speed regulating circuit. Current passing from conductor 20 to conductor 26 energizes the saturating winding 221a of magnetic amplifier element 221 as a differential function of the reference and control voltages, and this element provides excitation for winding 15c accordingly. Element 221 will become saturated whenever its saturating winding is energized by greater than a predetermined amount, and the amplifier output cannot exceed the value it has then attained. The circuit can be adjusted by resistance 225 so that as 221 saturates, the current in winding 15c is the same as allowed by the bypass circuit 27. Magnetic amplifier element 220 operates similarly for current flow from conductors 26 to 20 and excites the generator field winding 15c in the opposite direction with the same saturation limit.

If desired, the improved motor control systems shown in both Figs. 1 and 2 may omit the load current responsive resistor 34 and the control windings energized therefrom as for example wherever the motor load is of a mechanical nature rather than involving persons subject to physical discomfort. In such cases the principal advantages of the linear acceleration and deceleration of the motor with the maximum permissible speed of response and high degree of sensitivity will inherently be provided by the improved motor control systems embodying the by-pass circuit arrangement 27 of the present invention even when the resistor 34 and control windings energized therefrom are omitted.

Furthermore, in all cases where the speed of motor 11 is substantially proportional to the variable voltage of generator 13 then the tachometer generator 18 becomes unnecessary. Therefore, in such cases the circuits shown in Figs. 1 and 2 as energized by the voltage of tachometer generator 18 may just as well, if desired, be energized directly or by means of a voltage divider in accordance with the variable voltage of the generator 13 and the tachometer generator 18 may be eliminated, since the control results will remain substantially the same.

While I have shown and described a preferred and a modified form of my invention by way of illustration, many modifications will occur to those skilled in the art. I therefore contemplate by the appended claims to cover all such modifications as fall within the true spirit and scope of my invention.

What I claim as new and desire to secure by Letters Patent of the United States, is:

1. In a control system for a variable speed electric motor, an adjustable voltage generator having an output circuit adapted to be connected to said motor and a separately excited field winding, means for controlling the excitation of said generator comprising a high speed, high gain electric current amplifying means having an output circuit connected to said field winding, means for deriving a control voltage proportional to the speed of said motor, a source of adjustable reference voltage having a magnitude selectable in accordance with a desired operating speed of said motor, means for deriving and supplying to said amplifying means a first input signal proportional to the difference of said reference and control voltages, means for limiting the maximum magnitude of said first input signal to a predetermined value, means for deriving a second input signal proportional to the rate of change of current in said generator output circuit and utilizing said second input signal to control said amplifying means in a manner to oppose change of the rate of change of generator output current, and means for deriving a third input signal proportional to the rate of change of said control voltage and utilizing said third input signal to control said amplifying means in a manner to oppose change of the rate of change of said control voltage.

2. In a control system for a variable speed electric motor, an adjustable voltage generator having an output circuit adapted to be connected to said motor and a separately excited field winding, means for controlling the excitation of said generator comprising a high speed, high gain electric current amplifying means having an output circuit connected to said field winding, means for deriving a control voltage proportional to the speed of said motor, a source of adjustable reference voltage having a magnitude selectable in accordance with a desired operating speed of said motor, means for deriving and supplying to said amplifying means a first input signal proportional to the difference of said reference and control voltages, means for limiting the maximum magnitude of said first input signal to a predetermined value, means for deriving a second input signal proportional to the rate of change of current in said generator output circuit and supplying said second input signal to said amplifying means to control change of the output current of said amplifying means in a manner to oppose change of the rate of change of generator output current and thereby to limit the rate of change of acceleration of said motor to a substantially constant value, and means for deriving a third input signal proportional to the rate of change of said control voltage and supplying said third input signal to said amplifying means with time delay to oppose change of the output current of said amplifying means in a manner to limit the rate of change of said control voltage and thereby to limit the maximum acceleration of said motor to a predetermined value.

3. In a control system for a variable speed electric motor, an adjustable voltage generator having an output circuit adapted to be connected to said motor and a separately excited field winding, means for controlling the excitation of said generator comprising a high speed, high gain electric current amplifying means having an output circuit connected to said field winding, means for deriving a control voltage proportional to the speed of said motor, a source of adjustable reference voltage having a magnitude selectable in accordance with a desired operating speed of said motor, means for deriving and supplying to said amplifying means a first input signal proportional to the difference of said reference and control voltages, means for limiting the maximum magnitude of said first input signal to a predetermined value, means for deriving a second input signal proportional to the rate of change of current in said generator output circuit and utilizing said second input signal to control said amplifying means in a manner to oppose change of the rate of change of generator output current, means for deriving a third input signal proportional to the rate of change of said control voltage and utilizing said third input signal to control said amplifying means in a manner to oppose change of the rate of change of said control voltage, means for deriving a fourth input signal proportional to the magnitude of generator output current and utilizing said fourth input signal to control the excitation of said generator in cooperation with said first input signal, and means operable whenever said motor is at rest for deriving a fifth input signal proportional to residual current in said generator output circuit and utilizing said fifth input signal to control said amplifying means in a manner to oppose and neutralize the residual current.

4. In a control system for a variable speed electric motor, an adjustable voltage generator having an output circuit adapted to be connected to said motor and a separately excited field winding, means for controlling the excitation of said generator comprising an armature reaction excited dynamoelectric machine having an output circuit connected to said generator field winding and a plurality of control field windings, means for deriving a control voltage proportional to the speed of said motor, a source of adjustable reference voltage having a magnitude selectable in accordance with a desired operating speed of said motor, means for deriving and supplying to one said control field winding a first input signal proportional to the difference of said reference and control voltages, means for limiting the maximum magnitude of said first input signal to a predetermined value, means for deriving a second input signal proportional to the rate of change of current in said generator output circuit and supplying said second input signal to a second said control field winding in a manner to oppose change of the rate of change of generator output current, and means for deriving a third input signal proportional to the rate of change of said control voltage and supplying said third input signal to a third said control field winding in a manner to oppose change of the rate of change of said control voltage.

5. In a control system for a variable speed electric motor, an adjustable voltage generator having an output circuit adapted to be connected to said motor and a separately excited field winding, means for controlling the excitation of said generator comprising an armature reaction excited dynamoelectric machine having an output circuit connected to said generator field winding and a plurality of control field windings, means for deriving a control voltage proportional to the speed of said motor, a source of adjustable reference voltage having magnitude electable in accordance with a desired operating speed of said motor, means for deriving a first input signal proportional to the difference of said reference and control voltages, means utilizing said first input signal for energizing a first said control field winding, means for limiting the maximum energization of the first control field winding to a predetermined value, means for deriving a second input signal proportional to the rate of change of current in said generator output circuit, means utilizing said second input signal for energizing a second said control field winding to control change of the output current of said dynamoelectric machine in a manner to oppose change of the rate of change of generator output current thereby to limit the rate of change of acceleration of said motor to a substantially constant value, means for deriving a third input signal proportional to the rate of change of said control voltage, and means utilizing said third input signal for energizing a third said control field winding with time delay to oppose change of the output current of said dynamoelectric machine in a manner to limit the rate of change of said control voltage and thereby to limit the maximum acceleration of said motor to a predetermined value.

6. In a control system for a variable speed electric motor, an adjustable voltage generator having an output circuit adapted to be connected to said motor and a separately excited field winding, means for controlling the excitation of said generator comprising an armature reaction excited dynamoelectric machine having an output circuit connected to said generator field winding and a plurality of control field windings, means for deriving a control voltage proportional to the speed of said motor, a source of adjustable reference voltage having a magnitude selectable in accordance with a desired operating speed of said motor, means for deriving and suppling to a first said control field winding a first input signal proportional to the difference of said reference and control voltages, means for limiting the maximum magnitude of said first input signal to a predetermined value, means for deriving a second input signal proportional to the rate of change of current in said generator output circuit and supplying said second input signal to a second said control field winding in a manner to oppose change of the rate of change of generator output current, means for deriving a third input signal proportional to the rate of change of said control voltage and supplying said third input signal to a third said control field winding in a manner to oppose change of the rate of change of said control voltage, means for deriving a fourth input signal proportional to the magnitude of generator output current and supplying said fourth input signal to a fourth said control field winding in a manner to control the excitation of said generator in cooperation with said first input signal, and means operable whenever said motor is at rest for deriving a fifth input signal proportional to residual current in said generator output circuit and supplying said fifth input signal to the first said control field winding in a manner to oppose and neutralize the residual current.

7. In a control system for a variable speed electric motor, an adjustable voltage generator having an output circuit adapted to be connected to said motor and a separately excited field winding, means for controlling the excitation of said generator comprising an armature reaction excited dynamoelectric machine having an output circuit connected to said generator field winding and a plurality of control field windings, a tachometer generator positively coupled to said motor to provide a source of control voltage proportional to the speed of said motor, a source of adjustable reference voltage having a magnitude selectable in accordance with a desired operating speed of said motor, means for deriving a first input signal proportional to the difference of said reference and control voltages, means supplying said first input signal to a first said control field winding, a source of substantially constant direct voltage in combination with a pair of reversely connected half wave rectifiers connected in shunt relationship with said first control field winding to bypass the quantity of said first input signal in excess of a predetermined maximum value, means for deriving a second input signal proportional to the rate of change of current in said generator output circuit and supplying said second input signal to a second said control field winding in a manner to oppose change of the rate of change of generator output current, and means for deriving a third input signal proportional to the rate of change of said control voltage and supplying said third input signal to a third said control field winding in a manner to oppose change of the rate of change of said control voltage.

8. In a control system for a variable speed electric motor, an adjustable voltage generator having an output circuit adapted to be connected to said motor and a separately excited field excitation winding, means for controlling the excitation of said winding comprising a high speed, high gain electric current magnetic amplifying means having an output circuit connected with said field winding and a plurality of control windings, means for deriving a control voltage proportional to the speed of said motor, a source of adjustable reference voltage having a magnitude selectable in accordance with a desired operating speed of said motor, means for deriving and supplying to one of said control windings a first input signal proportional to the difference in polarity and magnitude of said reference and control voltages, means for limiting the maximum magnitude of said first input signal to a predetermined value, means for deriving a second input signal proportional to the rate of change of current in said generator output circuit and supplying said second input signal to a second of said control windings in a manner to oppose change of the rate of change of generator output current, and means for deriving a third input signal proportional to the rate of change of said control voltage and supplying said third input signal to a third said control field winding in a manner to oppose change of the rate of change of said control voltage.

9. In a control system for a variable speed electric motor, an adjustable voltage generator having an output circuit adapted to be connected to said motor and a separately excited field excitation winding, means for controlling the excitation of said winding comprising a high speed, high gain electric current magnetic amplifier having an output circuit connected with said field winding and a plurality of control windings, means for deriving a control voltage proportional to the speed of said motor, a source of adjustable reference voltage having a magnitude selectable in accordance with a desired operating speed of said motor, means for deriving and supplying to one of said control windings a first input signal proportional to the difference in magnitude of said reference and control voltages, means for limiting the maximum magnitude of said first input signal to a predetermined value, means for deriving a second input signal proportional to the rate of change of current in said generator output circuit and supplying said second input signal to a second of said control windings in a manner to oppose change of the rate of change of generator output current, and means for deriving a third input signal proportional to the rate of change of said control voltage and supplying said third input signal to a third of said control windings in a manner to oppose change of the rate of change of said control voltage.

10. In a control system for a variable speed electric motor, an adjustable voltage generator having an output circuit adapted to be connected to said motor and a separately excited field excitation winding, means for controlling the energization of said winding comprising high speed, high gain electric current amplifying means including interconnected rectifiers and saturable reactors having output connections with said field winding and a plurality of control windings for controlling the saturation of said reactors, means for deriving a control voltage proportional to the speed of said motor, a source of adjustable reference voltage having a magnitude selectable in accordance with a desired operating speed of said motor, means for deriving and supplying to one of said control windings a first input signal proportional to the difference in magnitude of said reference and control voltages, means for limiting the maximum magnitude of said first input signal to a predetermined value, means for deriving a second input signal proportional to the rate of change of current in said generator output circuit and supplying said second input signal to a second of said control windings in a manner to oppose change of the rate of change of generator output current, and means for deriving a third input signal proportional to the rate of change of said control voltage and supplying said third input signal to a third of said control windings in a manner to oppose change of the rate of change of said control voltage.

11. In a control system for a variable speed electric motor, an adjustable voltage generator having an output circuit adapted to be connected to said motor and separately excited variable opposite field excitation windings, each of said windings having means for controlling the energization thereof comprising high speed, high gain electric current magnetic amplifying means including interconnected rectifiers and saturable reactors having output connections with the field winding and a plurality of control windings, means for deriving a reversible control voltage proportional to the speed of said motor in each direction, a source of adjustable reference voltage having a polarity selectable in accordance with a desired operating direction of said motor and a magnitude selectable in accordance with a desired operating speed of said motor, means for deriving and supplying to one of said control windings of each magnetic amplifying means, a first input signal proportional to the difference and magnitude of said reference and control voltages, means for limiting the maximum magnitude of said first input signal of either polarity to a predetermined value, means for deriving a second input signal proportional to the rate of change of current in said generator output circuit and supplying said second input signal to a second of said control windings of each magnetic amplifying means in a manner to oppose change of the rate of change of generator output current, and means for deriving a third input signal proportional to the rate of change of said control voltage and supplying said third input signal to a third of said control windings of each magnetic amplifying means in a manner to oppose change of the rate of change of said control voltage.

12. In a control system for a variable speed electric motor, an adjustable voltage generator having an output circuit adapted to be connected to said motor and a separately excited field winding, means for controlling the excitation of said generator comprising a high speed, high gain electric current amplifying means having an output circuit connected to said field winding, means for deriving a control voltage proportional to the speed of said motor, a source of adjustable reference voltage having a magnitude selectable in accordance with a desired operating speed of said motor, means for deriving and supplying to said amplifying means a first input signal proportional to the difference of said reference and control voltages while said difference is below a predetermined value, means for limiting the maximum magnitude of said first input signal when said difference exceeds said predetermined value, and means for deriving a second input signal proportional to the rate of change of said control voltage and utilizing said second input signal to control said amplifying means in a manner to oppose change of the rate of change of said control voltage.

13. In a control system for a variable speed electric motor, an adjustable voltage generator having an output circuit adapted to be connected to said motor and a separately excited field winding, means for controlling the excitation of said generator comprising a high speed, high gain electric current amplifying means having an output circuit connected to said generator field winding and a plurality of control field windings, means for deriving a control voltage proportional to the speed of said motor, a source of adjustable reference voltage having a magnitude selectable in accordance with a desired operating speed of said motor, means for deriving and supplying to one said control field winding a first input signal proportional to the difference of said reference and control voltages while said difference is below a predetermined value, means for limiting the maximum magnitude of said first input signal when said difference exceeds said predetermined value, and means for deriving a second input signal proportional to the rate of change of said control voltage and supplying said second input signal to a second said control field winding in a manner to oppose change of the rate of change of said control voltage.

14. In a control system for a variable speed electric motor, means for controlling the speed of the motor including a high speed high gain electric current amplifying means having a control winding, means for deriving a control voltage proportional to the speed of said motor, a source of adjustable reference voltage having a magnitude selectable in accordance with a desired operating speed of said motor, means for deriving and supplying to said control winding an input signal proportional to the difference of said reference and control voltages while said difference is below a predetermined value, and a voltage limit current bypass circuit including a separately energized current conducting element and rectifier interconnected for diverting current from said control winding only when the difference of said reference and control voltages exceeds a voltage drop of said predetermined value in said element.

References Cited in the file of this patent

UNITED STATES PATENTS

| | | |
|---|---|---|
| 2,453,451 | Mosely | Nov. 9, 1948 |
| 2,519,339 | Avery | Aug. 22, 1950 |
| 2,607,908 | Edwards et al. | Aug. 19, 1952 |
| 2,677,085 | Sikorra | Apr. 27, 1954 |